United States Patent [19]

Rudmann

[11] 4,173,324
[45] Nov. 6, 1979

[54] COUPLING DEVICE FOR MOVING VEHICLES

[75] Inventor: Arthur A. Rudmann, Bowie, Md.

[73] Assignee: The United States of America as represented by the Administrator of the National Aeronautics and Space Administration, Washington, D.C.

[21] Appl. No.: 907,436

[22] Filed: May 19, 1978

[51] Int. Cl.² ........................... B64D 9/00; B64G 1/00
[52] U.S. Cl. .................................... 244/161; 269/156; 294/86 R; 294/113; 414/1
[58] Field of Search .......... 244/161, 158, 159, 135 A; 214/1 CM, DIG. 2, DIG. 3; 294/113, 86 R, 86.29, 86.26, 88, 110; 269/156; 188/74, 75, 296; 74/665 L; 414/1

[56] References Cited

U.S. PATENT DOCUMENTS

| | | | |
|---|---|---|---|
| 2,918,097 | 12/1959 | Thompson | 269/156 |
| 3,127,710 | 4/1964 | Karbowski | 269/156 |
| 3,904,233 | 9/1975 | Berry | 294/113 |
| 4,073,201 | 2/1978 | Taylor et al. | 74/665 L |
| 4,105,241 | 8/1978 | Mee | 294/86 R |

FOREIGN PATENT DOCUMENTS

473660 9/1975 U.S.S.R. ..................................... 294/88

Primary Examiner—Galen L. Barefoot
Attorney, Agent, or Firm—Robert D. Marchant; John R. Manning; John O. Tresansky

[57] ABSTRACT

A mechanical system is disclosed to capture and/or deploy a device or vehicle having relative motion with respect to another vehicle. The mechanism includes an on-board controlled collapsible iris assembly located at the end of a controlled manipulator system carried by one moving vehicle. The iris assembly by means of the manipulator system encircles a probe located on the other moving vehicle whereupon the iris assembly is activated and one or more iris elements close around the probe, thus capturing and axially aligning the other vehicle with the iris assembly. Additionally, a rotator assembly is included for spinning the iris assembly in a manner adapted to engage the probe of a spinning vehicle. Deployment of the other vehicle is accomplished by reversing the capture procedure.

14 Claims, 30 Drawing Figures

COUPLING DEVICE FOR MOVING VEHICLES

ORIGIN OF INVENTION

The invention described herein was made by an employee of the U.S. Government and may be manufactured and used by or for the Government for governmental purposes without the payment of any royalties thereon or therefor.

BACKGROUND OF THE INVENTION

This invention relates generally to a device for coupling two bodies and more particularly to a mechanism for capturing or deploying two moving vehicles in a low gravity environment.

In the low gravity environment of space, various types of docking apparatus for space vehicles are known. For example, prior spacecraft capture and development experience has utilized end effector/receptor devices employing massively built mechanical linkage coupling arrangements. In such apparatus, any spacecraft positional instability resulting from a very light asymmetrical contact between the two spacecraft has been stabilized by the use of gas reaction controlled jet systems positioned on both contacting spacecraft. In addition to mechanical linkages of the type described, there are known capture systems which utilize wire cables or other means which become taut at the final stage of expected capture.

While the prior art for all practical purposes presumably operates as intended, certain inherent limitations nevertheless exist in such apparatus. For example, a spacecraft may not be remotely captured or deployed from considerable distances from an orbiter. Since momentum wheel attitude controlled spacecraft are difficult to capture without causing unstable motions through unintentional inprecise collisions, high impulse attitude control jet systems are required to stabilize the two engaging spacecrafts. Also spacecraft deployment is subject to considerable tip-off due to locked in asymmetries. Additionally, existing spacecraft capture deployment mechanisms require considerable spacecraft space and weight allotment. Similar problems exist in coupling moving vehicles in a low gravity water environment as well as in gravity environments, such as in air or on land.

It is an object of the present invention to provide an improved mechanism for capturing and deploying relatively moving vehicles.

Another object of this invention is to provide a device for coupling objects moving in a low gravity medium.

It is another object of the present invention to provide a system that is able to capture a spinning vehicle as well as spin up and deploy a spinning vehicle which has been previously captured.

Still a further object of the present invention is to provide a capturing mechanism which need not be axially aligned with the spacecraft to effect the capture and in the course of release of the spacecraft during deployment the spacecraft need not remain axially aligned with the mechanism.

Another still further object of the invention is to provide a capture and deployment mechanism which is adapted to operate in conjunction with a conventional mechanical manipulator system utilized on space flight vehicles such as a space shuttle orbiter.

Briefly, these and other objects are attained by an arrangement of an end effector including a collapsible iris assembly located at the remote end of an articulated manipulator system carried on board one moving vehicle. When deployed a predetermined distance away from the vehicle, the iris assembly is positioned to receive a probe, i.e., an outwardly projecting end receptor attached to another moving vehicle which is to be captured or deployed. With the end receptor positioned within the iris assembly, it is actuated by the manipulator system through an interface adapter to close around the end receptor, thus capturing and axially aligning the other vehicle with the iris assembly. Additionally, a rotator assembly is located between the manipulator system and the end effector to rotate the iris assembly to receive a rotating vehicle or to spin up the vehicle for deployment.

DESCRIPTION OF THE PREFERRED EMBODIMENTS

Figures 1, 2:
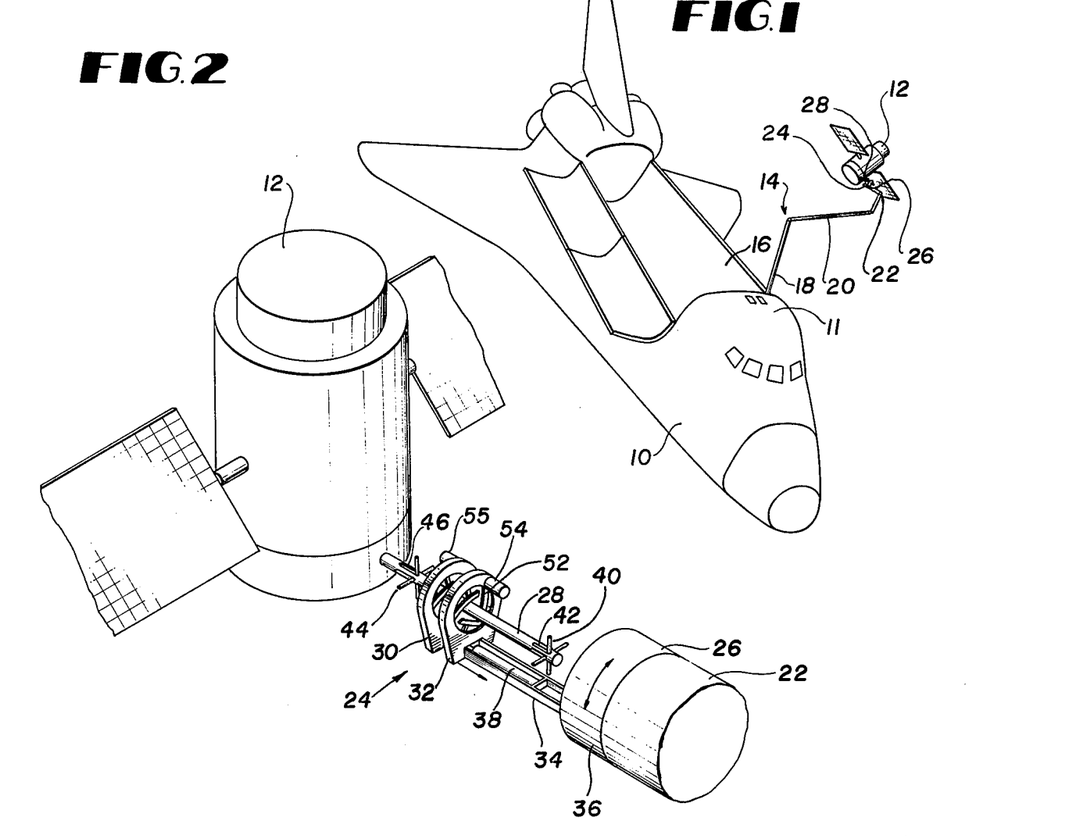
FIG. 1 is a perspective view of a space shuttle orbiter linked to an orbiting spacecraft via a manipulator system.
FIG. 2 is a partial perspective view of a probe type end receptor engaged by a first embodiment of the end effector of the subject invention.

Referring now to the drawings and more particularly to FIG. 1, reference numeral 10 denotes an orbiter vehicle such as a space shuttle which is designed to perform a variety of missions, one typical example being the capturing and/or deploying various types of spacecraft 12, e.g., satellites in earth orbit. This procedure, moreover, is accomplished a predetermined distance away from vehicle 10 by means of a conventional articulated manipulator system 14, which is adapted to project from a storage compartment or bay 16 and be remotely controlled by the crew quartered within the cabin area 11.

The manipulator system 14 shown in FIG. 1 constitutes known apparatus and includes an upper arm 18, a lower arm 20, and a wrist section 22. An end effector 24 is interfaced with the wrist section 22 by means of a rotator assembly 26, including suitable slip ring means, not shown, which is adapted to rotate the end effector 24 during capture or deployment in order to accommodate relative motion between the spacecraft orbiter during capture as well as being able to spin up the spacecraft in the desired manner upon deployment. Contact between the end effector 24 and the spacecraft 12 is made by means of an end receptor 28 attached to the spacecraft 12.

The end effector 24 shown in FIG. 1 comprises two embodiments of an axially moveable collapsible iris assembly which when open is adapted to receive or be positioned around the end receptor 28 which preferably constitutes an elongated probe as shown in FIG. 2. When desirable the end receptor may be configured as an extensible structure, boom or tether. The spacecraft 12 need not be axially positioned with respect to the central axis of the iris assembly. It is only necessary that the probe or end receptor 28 passes through an aperture in the iris assembly housing. Thereafter, operation of the iris assembly upon control from within the orbiter vehicle 10 close around the probe to capture and axially align the spacecraft 12 with the axis of the iris assembly.

Referring now to FIG. 2, there is disclosed in a semi-diagrammatical representation the first embodiment of the iris assembly, the details of which are further illustrated in FIGS. 4-8. FIG. 2 shows a double iris configuration wherein a pair of iris housings 30 and 32 are axially aligned on a support assembly including a support beam 34. The support beam 34 is attached to the outer ring 36 of the rotator assembly 26. The outer iris housing 30 is stationary while the inner housing 32 is adapted to be moved away from the outer housing along the support beam 34 by means of a linear actuator 38. In operation, the two iris housings 30 and 32 are adapted to be positioned relatively close to one another during the initial phases of the capture procedure, but thereafter the inner iris housing 32 is moved away from the housing 30 during the final phases as will be explained when FIGS. 12-18 are considered.

With respect to the elongated probe-type end receptor 28 attached to the spacecraft 12 it includes limit travel stop means 40 consisting in one optional configuration of one or more members which are normally folded into respective recesses 42 contained in the surface of the receptor but on command project outwardly therefrom. In a like manner, a captive retainer means 44 also optionally consisting of one or more elements is located at the opposite or near end of the receptor 28. These elements are also adapted to be maintained in a stowed position in respective slots 46 but project outward on command. The limit travel stop and captive retainer mechanisms 40 and 44 are selectively activated subsequent to the probe 28 passing through the iris housings 30 and 32.

Figure 3:
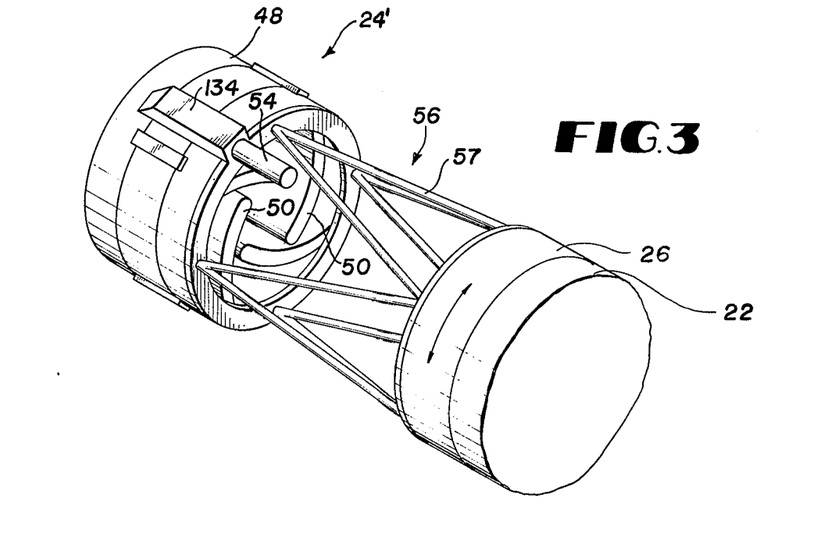
FIG. 3 is a perspective view of a second embodiment of an iris type end effector according to the subject invention.

A simpler form of the invention is depicted in FIG. 3. It consists of a single iris assembly contained within one housing 48 as opposed to the two housings 30 and 32 shown in FIG. 2. Whereas in both instances collapsible iris members are included within the respective housings, the embodiment shown in FIG. 3 is adapted to include relatively wide iris elements 50 while the double configuration utilizes relatively narrow or blade type iris elements 52. In both instances means are included in the respective iris configurations for being actuated from the orbiting vehicle 10 through the manipulator system 14 and a suitable interface. The specific actuator means may take many froms, however, one typical example is by means of a mechanical gear arrangment, to be described, operated in accordance with mechanical operators 54 and 55 coupled back to the rotator assembly 26. Whereas the double iris configuration shown in FIG. 2 is mounted upon at least one support beam 38, the single iris configuration shown in FIG. 3 is mounted upon an adaptor assembly 56 consisting of multiple struts 57 coupled between the iris housing 48 and the rotator assembly 26.

Figures 4, 5, 6, 7, 8:
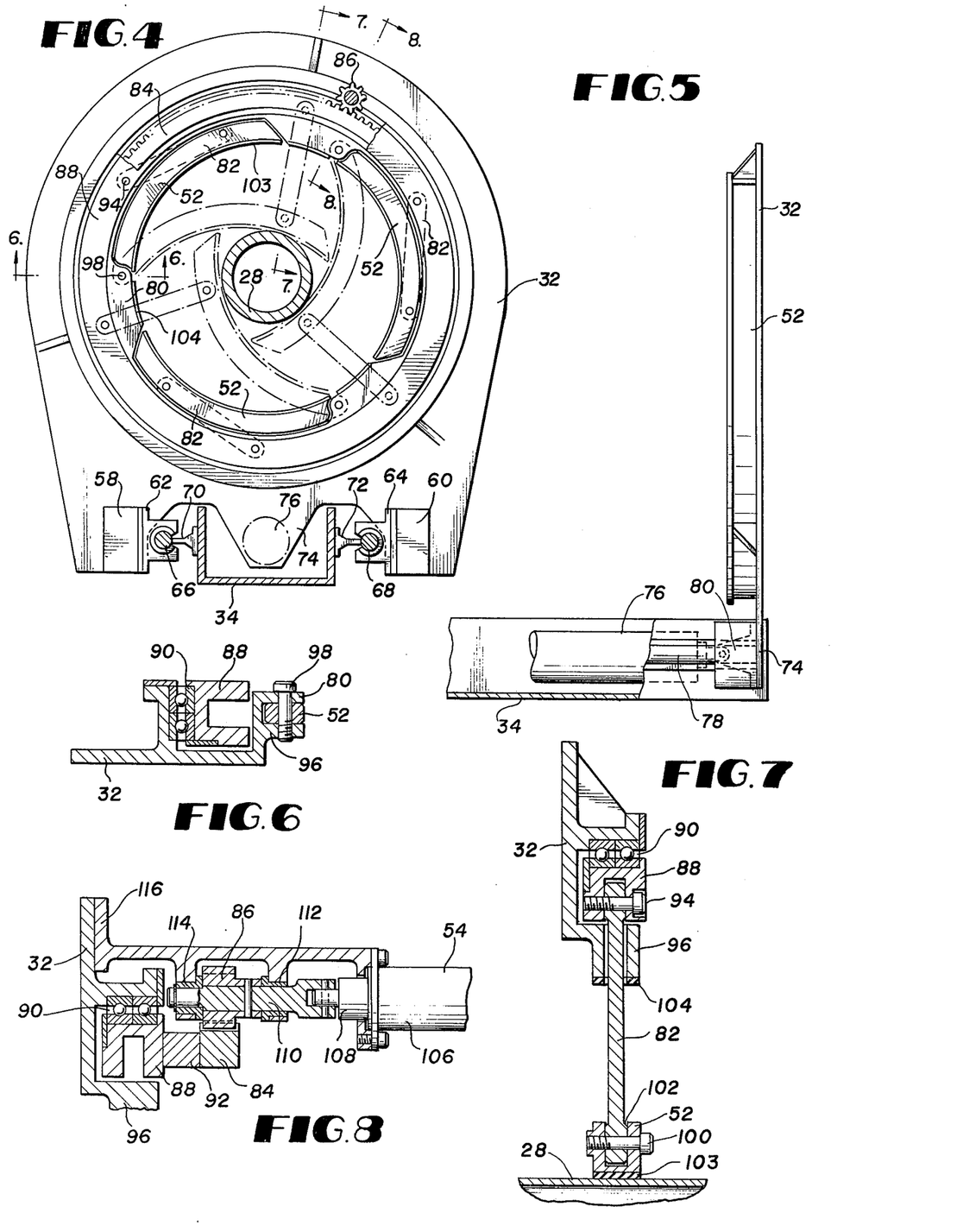
FIG. 4 is a front plan view partially in section of the first embodiment of end effector shown in FIG. 2.
FIG. 5 is a partial side elevational view partially in section of the assembly shown in FIG. 4.
FIG. 6 is a cross sectional view of the assembly shown in FIG. 4 taken along the lines 6—6.
FIG. 7 is a cross sectional view of the assembly shown in FIG. 4 taken along the lines 7—7.
FIG. 8 is a cross sectional view of the iris assembly shown in FIG. 4 taken along the lines 8—8.

Proceeding now to the details of the collapsible iris embodiments, reference is now made to FIGS. 4-8, which are illustrative of the details of the double iris concept. Shown in FIG. 4, there is an iris housing, for example, the inward housing 32 shown in FIG. 2, which is adapted to move axially along the iris support beam 34. This movement is provided by means of a pair of mounting brackets 58 and 60 to which is attached a pair of open pillow blocks 62 and 64. The pillow blocks 62 and 64 are adapted to slide upon the shafts 66, 68 attached to shaft support rails 70, 72, secured to the outer vertical walls of the iris support beam 34. The lower portion of the housing 32 intermediate the rails 70 and 72 includes a section 74 which resides within the iris support beam 34 and is adapted to contain a linear actuator 76 which is adapted to axially move the housing 32 away from the fixed housing 30 shown in FIG. 2. This structure is additionally shown in FIG. 5. FIG. 5 shows, in addition to the details of the linear actuator 76 which may be a piston having a rod 78 coupled to an attachment bracket 80 which is secured to the housing portion 74 (FIG. 4), the relatively narrow width dimension of the housing 32 and the iris elements 52 included therein.

Referring back to FIG. 4, the iris blade elements 52 shown therein are three in number. The three elements 52 are curvilinear blade type members pivotally attached to an inner circular portion 80, which is also adapted to receive the iris elements when unactivated in a nesting relationship such that a common inner diameter substantially greater than the diameter of the probe 28 is provided. The iris blade type elements are adapted to be pivoted away from the nesting position inwardly towards the longitudinal central axis of the housing 32 by means of a drive link 82 coupled from the forward part of the iris element to an annular ring gear 84, which is adapted to be driven by a pinion gear 86. It can be seen that by rotation of the spur gear 84 through the pinion gear 86, that a clockwise travel of the spur gear 84 cause the link 82 to force the respective blade members 52 simultaneously inward and close about any object therein, e.g., the end receptor probe 28 forcing it to the center.

As to the further structural details of the iris assembly shown in FIG. 4, reference is now made briefly to FIGS. 6, 7 and 8. Referring briefly to FIG. 6 which is a cross sectional view taken along line 6—6 of FIG. 4, reference numeral 32 refers to the iris housing in which is located an annular channel member 88 held in place and rotatable by means of a ball bearing assembly 90. The channel 88 is coupled to the ring gear 84 by means of a coupling member 82 shown in FIG. 8 and includes a rectangular cross sectional space which receives one end of the link 82 as shown in FIG. 7 and which is coupled thereto by means of the screw 94. The housing 32 additionally terminates in an inwardly angulated bifurcated portion 96 which receives the pivotal end of the iris blade 52 being held thereat by means of the screw 98.

FIG. 7 additionally shows that the outer end of the link 82 is coupled to the blade member 52 by means of the screw 100. The iris blade element 52 itself comprises a channel type member which is adapted to receive the link 82 in the recess 102 when in the fully retracted or open position. The outer surface of the iris blade 52 has a frictional surface member 103 attached thereto for engagement with the end receptor 28. Additionally, portions of the bifurcated housing portion 96 adjacent the iris blades 52 contain like frictional members 104 so that as illustrated in FIG. 4 when the iris blades 52 are retracted, a substantially continuous inner surface of frictional elements 103 and 104 is provided on the inside of the iris housing 32.

FIG. 8 is a cross sectional view of the arrangement of elements shown in FIG. 4 taken along the lines 8—8 and shows the manner in which the iris blade elements 52 are actuated.

The mechanical operator 54 depicted in FIG. 2 is further illustrated in FIG. 8 and is shown including a tubular housing 106 through which passes a shaft 108 which couples to the coupling element 110 which in turn engages the pinion gear 86. The coupling element 110 is held in place by means of journaled bearing assemblies 112 and 114 attached to the support member 116 which forms part of the iris housing 32. Thus power is transmitted to the members 108 and 110 from the manipulator system 14 through the rotating assembly 26.

The iris assembly shown in FIG. 4 may operate with a second like structure to receive or release the end receptor probe 28 in a manner to be described.

Figure 9:
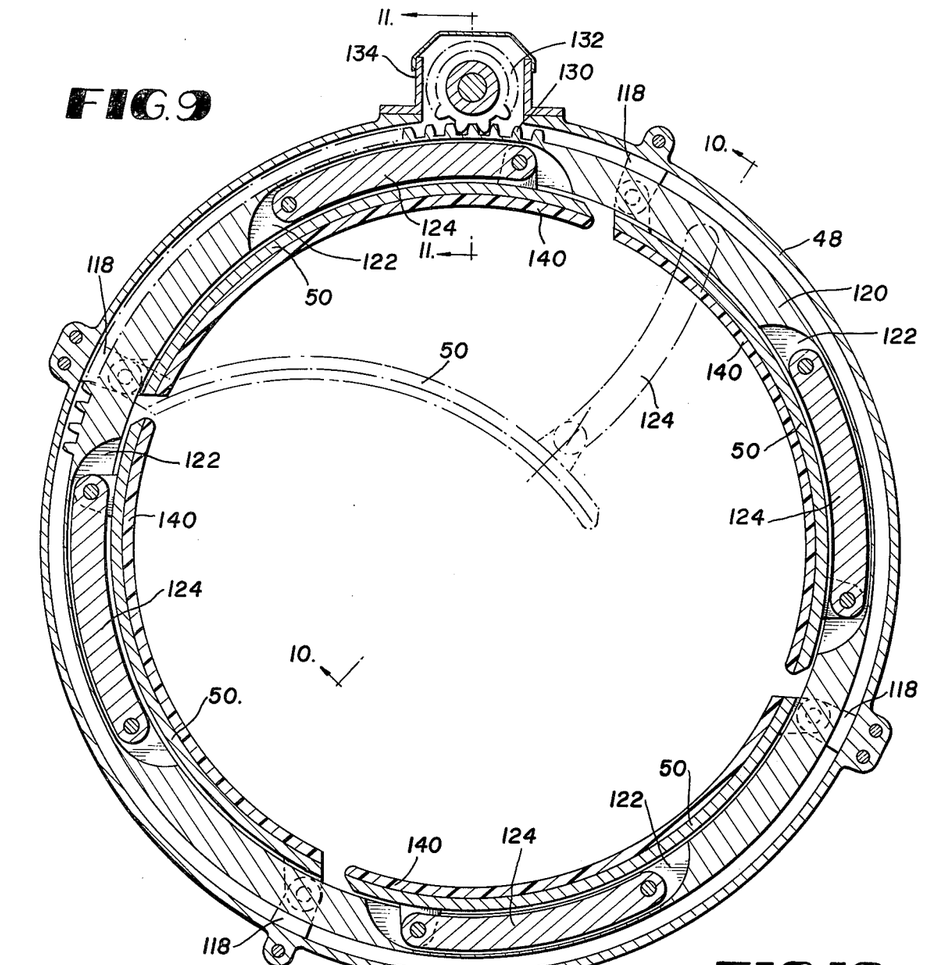
FIG. 9 is a front elevational view partially in section of the iris type end effector shown in FIG. 3.
Figures 10, 11:
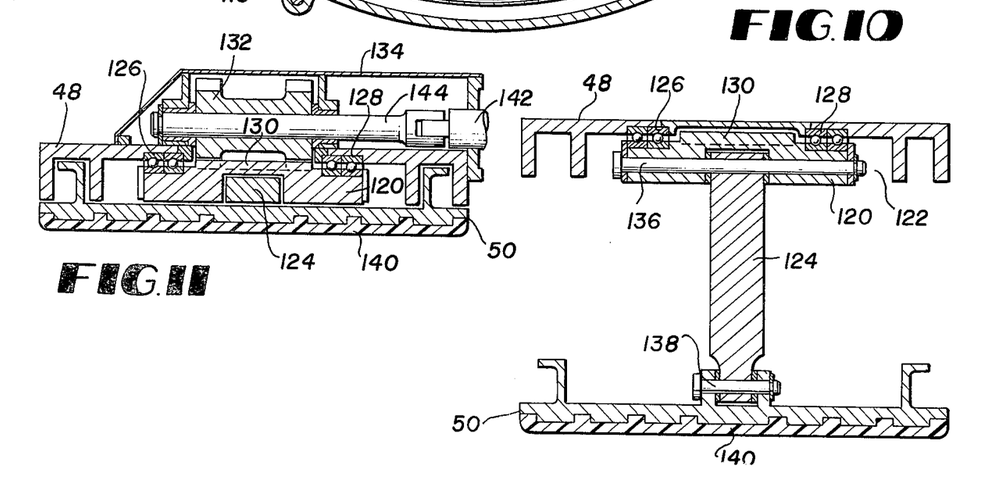
FIG. 10 is a cross sectional view of the assembly shown in FIG. 9 taken along the lines 10—10.
FIG. 11 is a cross sectional view of the iris assembly shown in FIG. 9 taken along the lines 11—11.

Referring now to FIGS. 9–11, there is shown the mechanical details of the single iris embodiment shown in FIG. 3. The single iris structure effectively mechanizes a pair of irises such as described above but whose relative separation distances are fixed. Referring now to FIG. 9, the relatively wide iris blade elements 50 are pivotally connected to inwardly projecting mounting blocks 118 attached to the inner surface of the housing 48. An annular ring 120 within the housing 48 has a plurality of recesses 122 therein which is adapted to accommodate the drive links 124. The ring 120 is rotatable within the housing 48 by means of the bearing assemblies 126 and 128. Additionally, a portion of the outer surface of the ring 120 includes gear teeth 130 which engage a double pinion gear 132 contained in a protective housing 134.

The relative width of the iris blades 50 is demonstrated in the sectional views of FIGS. 10 and 11. FIG. 10 additionally shows relatively long bolts or pins 136 and 138 which interconnect the drive link 124 to the ring member 120 and the respective iris blade element 50. FIG. 10 additionally shows that the relatively wide iris blade element 50 has a frictional surface contact member 140 applied to its outer surface for contacting an end receptor, not shown.

FIG. 11 shows the details of the drive mechanism for the relatively wide iris blade 50 shown in its retracted position. The drive mechanism is similar to that utilized for the double iris configuration in that the pinion gear 132 is coupled back to the manipulator system 14 (FIG. 1) via a drive shaft 142 which is coupled to a journaled coupling element 144 inside of the protective housing 134. By selective rotation of the spur gear 132 through the coupling 144 and the drive shaft 142, the circular ring 120 is rotated from a closed position of the blades 50 clockwise which pushes the blade members 50 towards the center of the circular opening in the housing 48 and thus make contact with a probe type end receptor not shown or alternatively, being moved in the opposite direction to release an end receptor.

The manner in which the subject invention operates may be better understood by reference to the diagrams of FIGS. 12 through 30. More particularly, FIGS. 12–23 schematically illustrate the operation of the double iris configuration while FIGS. 24–30 illustrate the operation of the single iris configuration.

Figure 12:
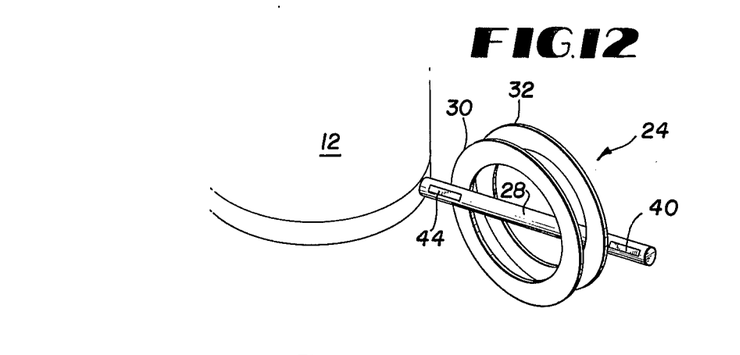
FIGS. 12–23 are diagrammatical illustrations of the operation of the double iris assembly shown in FIG. 2 during a capture sequence.

A brief reference to FIG. 12 will be helpful in relating the physical embodiments of the subject invention already described above to the schematic representations to follow. As before, reference numeral 12 represents the spacecraft to be captured or deployed by means of an end effector assembly 24 (FIG. 1). In the diagram of FIG. 12, the end effector 24 is intended to depict the forward iris housing 30 and an aft iris housing 32 including respective iris blades therein providing a pair of end effector mechanism through which the spacecraft end receptor 28 passes initially at least in a relatively course position, meaning that the end receptor 28 is not necessarily aligned with the center axis of the two iris housings 30 and 32.

Figure 13:
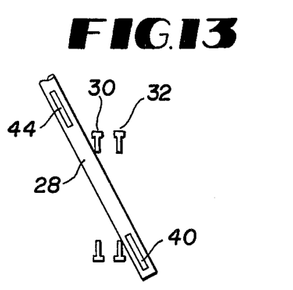
Figure 14:
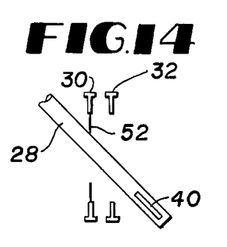
Figure 15:
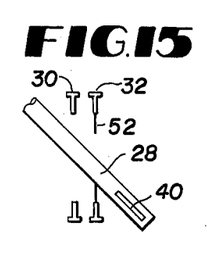
Figure 16:
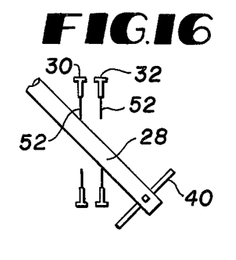
Figure 17:
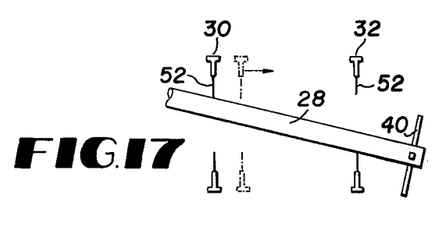

FIG. 13 illustrates the worst possible case wherein the angle of the end receptor 28 is at its maximum departure from the center axis of the pair of iris housings 30 and 32, with the respective iris blade elements, not shown, fully retracted, such as shown in FIG. 4. Capture is accomplished in a multiple sequence of iris blade activation which may encompass any one or a combination of steps illustrated in FIGS. 14 through 18. Following the initial acquisition as shown in FIG. 13, typically the first step would be to actuate the forward end iris blades 52 in the housing 30 as shown in FIG. 14 to contact the end receptor 28 and urge the proximal end of the probe 28 inwardly. Following this, as depicted in FIG. 15, the blades in the forward iris housing 30 are retracted and the blades 52 in the rear assembly 32 are activated, providing a further nudging action at the distal end of the probe 28. Following this, both iris assemblies 30 and 32 are actuated, causing the respective blades 52 to contact both ends of the end receptor 28. FIG. 16 also indicates that the limit stop mechanism 40 may also be deployed on command from the spacecraft 12. FIG. 17 next illustrates that while both sets of iris blades 52 are extended in the manner shown in FIG. 16, the rear iris assembly 32 is moved away from its initial position adjacent the housing 30, which will cause a further swing of the end receptor 28 into axial alignment. The final docking step next involves a full actuation of the iris blades 52 in the assemblies 30 and 32 while separate, which will cause the end receptor to be in full alignment with the central axis of the two iris assemblies 30 and 32. At this time the captive retainer assembly 44 is activated.

Figure 18:
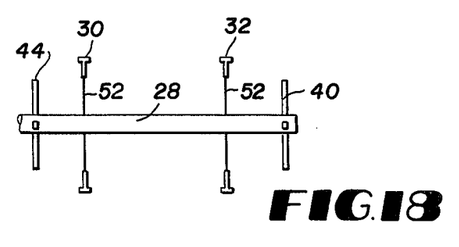

Thus a selective closing of the iris blades 52 is designed to gently displace the spacecraft 12 from its initial entry position into the end receptor shown in FIG. 13 to that shown in FIG. 18. Because a certain amount of rotation may occur as a result of the sequence shown or in the event that the spacecraft itself is rotating, the rotation assembly 26 shown in FIG. 2 offsets this. Additionally, any precession furthermore can easily be overcome by repeating the realignment process shown.

Figure 19:
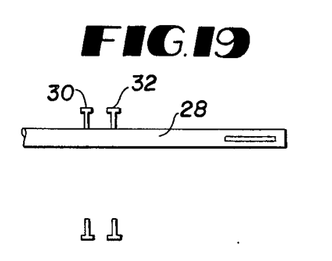
Figure 20:
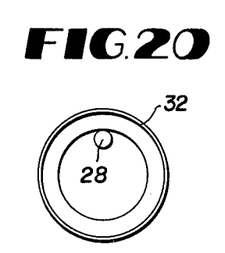
Figure 21:
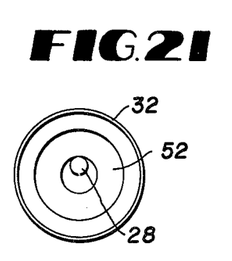

While the FIGS. 13 through 18 illustrate the worst possible entry condition, FIGS. 19 through 20 depict a less drastic procedure as well as illustrating such a procedure viewed along the axial or front elevation direction. FIG. 19, for example, illustrates the end receptor being axially aligned but offset from the central axis of the pair of iris assembly housings 30 and 32. While FIGS. 19 and 23 illustrate side views, FIGS. 20-22 constitute front elevational views of the capture procedure. In FIGS. 19 and 20, the interceptor 28 is positioned to one side of the iris assemblies 30 and 32 which may be, for example, the top side, as depicted in FIG. 20. In FIG. 21 it can be shown that as the irises close, they gently move the end receptor 28 inwardly towards the center. Considering FIGS. 22 and 23, there is depicted the full closure of the irises in the same fashion as shown with respect to FIG. 18, with the assemblies 30 and 32 being moved apart and with the limit travel stops 40 extended.

Figure 22:
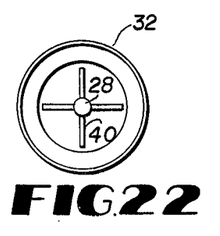
Figure 23:
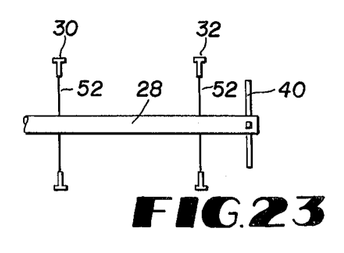
Figure 24:
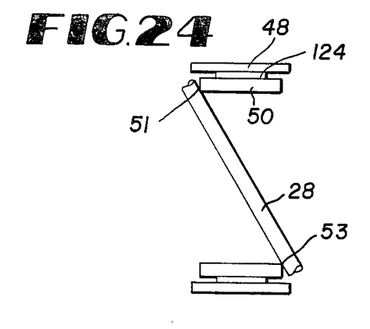
FIGS. 24–30 are diagrammatic illustrations illustrative of the capture sequence obtained by means of the single iris assembly shown in FIG. 3.
Figure 25:
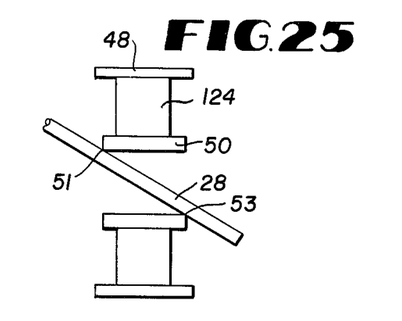
Figure 26:
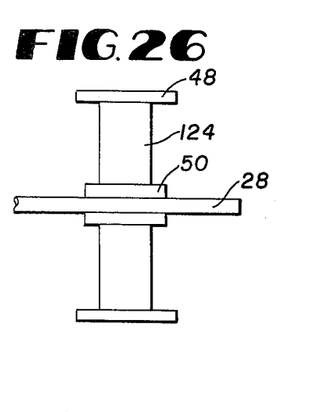

With respect to the single iris assembly, FIGS. 24-26 depict its operation for a first orientation of the end receptor 28 similar to that shown in FIG. 12, while FIGS. 27 through 30 depict an orientation such as shown in FIGS. 19-23. Whereas in the former embodiment where pairs of iris blades 52 contacted the end receptor 28, in the single iris embodiment as shown in FIG. 24 in the worst possible orientation of the end receptor 28, the opposite outside edges 51 and 53 contact the end receptor, which as the iris blades 50 are urged inwardly, rotate the end receptor as shown in FIG. 25, with a completed capture and alignment being shown in FIG. 26.

Figure 27:
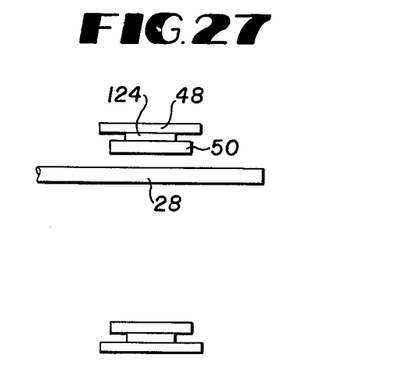
Figure 28:
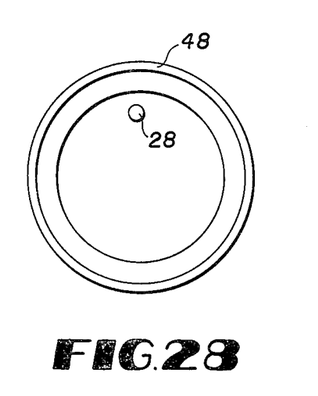
Figure 29:
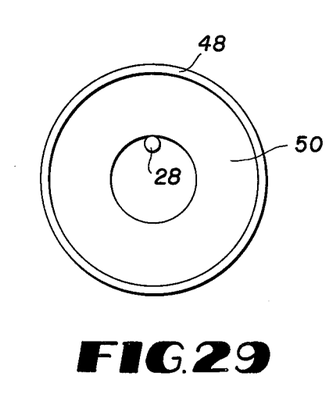
Figure 30:
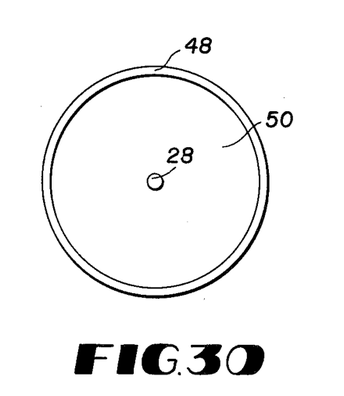

With respect to FIGS. 27 and 28, which respectively disclose side and front elevational views of a parallel offset entry of the end receptor 28 into the iris assembly, its closure as shown by the mid-closure of FIG. 29 and the full closure of 30 merely moves the end receptor towards the center axis in the same manner as shown with respect to FIGS. 22 and 23.

In all instances, substantial axial and torsional restraint between the spacecraft 12 and the end effector 24 is maintained through friction between the contacting surfaces. When desirable, the spacecraft 12 can be berthed within the storage compartment or bay 16 of the orbiter 10 by means of the manipulator system 14 according to techniques already known.

Deployment of a spacecraft 12 is substantially the reverse process of the capture procedure previously described wherein the manipulator system 14 takes a stowed spacecraft 12 from the compartment 16, positions it at a safe distance from the orbiter 10 and decoupled without tumbling to the extent introduced by the stability of the orbiter or when desirable, a spin can be imparted by means of the rotator assembly 26.

Thus what has been shown and described is a capture and deployment mechanism for use with both large and small spacecraft with the removal of torsional and translational disturbances resulting from the relative motion between the spacecraft and orbiter by the orbiter attitude control system, as well as that included in the spacecraft itself. The provision of means to permit capture and deployment away from the orbiter itself not only minimizes and/or eliminates possible orbiter contamination effects on the spacecraft, it is adapted to protect the spacecraft from collisions with appendages or possible spacecraft instrumentation view angle interference. In other words, minimum orbiter-spacecraft interference results.

While the preferred embodiments of the invention have been described with a certain amount of particularity, it is to be understood that such description is made by way of illustration and not limitation. Thus, although the invention has been described in the context of a space application, it may also be used in a gravity environment, such as on land and in the air, as well as in another low gravity environment such as water. Accordingly, it is to be understood that conventional and obvious substitutions, modifications and reversal of parts may be resorted to without departing from the spirit or scope of the invention as defined by the invention as claimed.

What is claimed is:

1. A system for capturing and deploying first craft means having motion relative to a second craft means wherein said second craft means includes remotely controlled manipulator apparatus, the combination comprising:
   outwardly projecting end receptor means located on said first craft means; and
   end effector means including a collapsible iris assembly coupled to the manipulator apparatus and operated from said second craft means through said manipulator apparatus, said iris assembly having a pair of axially movable independently operable iris mechanisms, each of said iris mechanisms having a plurality of iris elements adapted to be positioned around said end receptor means and upon command being operable to close and open for respectively engaging and releasing said end receptor means.

2. The system as defined by claim 1 wherein each iris mechanism includes a housing having a central longitudinal opening and wherein said plurality of iris elements are located on the edge of said opening.

3. The system as defined by claim 2 wherein each iris mechanism includes means for operating the respective iris elements in unison.

4. The system as defined by claim 3 and additionally including means for selectively moving one iris mechanism a predetermined distance away from the other iris mechanism while maintaining a common longitudinal central axis.

5. The system as defined by claim 4 wherein said last recited means for moving one iris mechanism away from the other iris mechanism is controlled from said remotely controlled manipulator apparatus.

6. The system as defined by claim 1 wherein said plurality of iris elements in each said housing comprises pivotally mounted relatively narrow blade like elements having a frictional surface for engaging said end receptor means.

7. The system as defined by claim 6 and additionally including drive means in said housing coupled to the plurality of blade like elements for being pivoted inwardly and thereby close upon said end receptor means.

8. The system as defined by claim 7 wherein said drive means comprises a ring gear mounted in said housing adjacent said pivotally mounted blade like elements and a connecting drive link coupling said ring gear to said blade like elements to provide pivotal motion of said blade like elements.

9. The system as defined by claim 8 and additionally including means coupled to said manipulator apparatus for driving said ring gear.

10. The system as defined by claim 9 wherein said last recited means comprises a pinion gear assembly coupled to said ring gear.

11. The system as defined by claim 1 and additionally including interface adaptor means coupled between said manipulator apparatus and said iris assembly.

12. The system as defined by claim 11 wherein said interface adaptor means includes a rotation assembly for providing a predetermined rotation of said iris assembly along its central longitudinal axis.

13. The system as defined by claim 1 wherein said end receptor comprises an elongated member having selectively operable captive retainer means located at the outer or distal end of said member and a selectively operable limit travel stop means at the near or proximal end of said member, said captive retainer means and said limit travel stop means being separated by a distance sufficient to be on opposite sides of said iris assembly when in engagement therewith.

14. The system as defined by claim 13 wherein said captive retainer means and said limit travel stop means comprises members stowed along the surface of said end receptor and being adapted to be actuated and extend outwardly therefrom to provide transverse projecting members.

* * * * *